(12) United States Patent
Sasa (10) Patent No.: US 8,492,649 B2
(45) Date of Patent: Jul. 23, 2013

(54) TENSION BALANCER FOR OVERHEAD WIRE AND TENSION BALANCER INSTALLATION AUXILIARY DEVICE FOR OVERHEAD WIRE

(75) Inventor: Osamu Sasa, Isehara (JP)

(73) Assignee: NHK Spring Co. Ltd., Isehara, Kanagawa (JP)

( * ) Notice: Subject to any disclaimer, the term of this patent is extended or adjusted under 35 U.S.C. 154(b) by 0 days.

(21) Appl. No.: 12/680,019

(22) PCT Filed: Oct. 15, 2009

(86) PCT No.: PCT/JP2009/067862
§ 371 (c)(1),
(2), (4) Date: Mar. 25, 2010

(87) PCT Pub. No.: WO2010/076859
PCT Pub. Date: Jul. 8, 2010

(65) Prior Publication Data
US 2011/0253443 A1    Oct. 20, 2011

(30) Foreign Application Priority Data

Dec. 29, 2008  (JP) .................................. 2008-335731

(51) Int. Cl.
*H02G 7/02*   (2006.01)
*H02G 7/05*   (2006.01)
*H02G 7/18*   (2006.01)

(52) U.S. Cl.
USPC ................. 174/45 TD; 174/40 TD; 174/40 R (58) Field of Classification Search
USPC ................ 174/40 R, 40 TD, 45 TD; 439/451, 439/452; 200/79; 248/61
See application file for complete search history.

(56) References Cited

U.S. PATENT DOCUMENTS 481,666 A * 8/1892 Furgang ........................ 200/79

FOREIGN PATENT DOCUMENTS

| JP | 11-048834 | 2/1999 |
| JP | 2000-158980 | 6/2000 |
| JP | 2000-255288 | 9/2000 |
| JP | 2004-042780 | 2/2004 |
| JP | 2008-114850 | 5/2008 |

OTHER PUBLICATIONS

Korean Office Action dated Jul. 1, 2011 for Korean Application No. KR 10-2010-700351.
Chinese Office Action (Application No. CN 200980100508.6) dated Jan. 14, 2013.

* cited by examiner

*Primary Examiner* — Hoa C Nguyen
*Assistant Examiner* — Binh Tran
(74) *Attorney, Agent, or Firm* — Nixon Peabody LLP; Jeffrey L. Costellia (57) ABSTRACT

A tension balancer installation auxiliary device is provided including a fixing pipe which includes two open ends, a slit and a pair of first apertures, and a yoke, wherein one end of the fixing pipe is arranged to contact with a casing of the tension balancer, and the yoke is attached by passing through a pair of first through holes of a pair of shackle shaped connecting parts of the tension balancer and the pair of first apertures.

13 Claims, 12 Drawing Sheets

Fig.12

TENSION BALANCER FOR OVERHEAD WIRE AND TENSION BALANCER INSTALLATION AUXILIARY DEVICE FOR OVERHEAD WIRE

CROSS REFERENCE TO RELATED APPLICATIONS

This application is based upon and claims the benefit of priority from the prior Japanese Patent Application No. 2008-335731, filed on Dec. 29, 2008, and PCT Application No. PCT/JP2009/067862, filed on Oct. 15, 2009, the entire contents of which are incorporated herein by reference.

BACKGROUND OF THE INVENTION

1. Technical Field

The present invention is related to a tension balancer which provides a continuous and appropriate tension to an overhead wire such as a train overhead wire, in particular an auxiliary hanging cable, a trolley line and a hanging overhead wire, and an auxiliary device when installing the tension balancer on an overhead wire.

2. Description of the Related Art

A continuous and appropriate tension is applied to a train overhead wire for supporting safe train transport and preventing slack or cable disconnection of the train overhead wire. Changes in the tension of a train overhead wire because of stretching or tilt of a support pillar due to a change in temperature can lead to accidents. Generally, a spring type tension balancer or a pulley type tension balancer is arranged on a train overhead wire in order to prevent such problems and in recent years the demand for spring type tension balancers is increasing due to their compact size and ease of use.

Among spring type tension balancers there is a coil spring type and gas spring type tension balancer. (Refer to Japanese Laid Open Patent 2008-114850 and Japanese Laid Open Patent 2000-255288).

Figure 12:
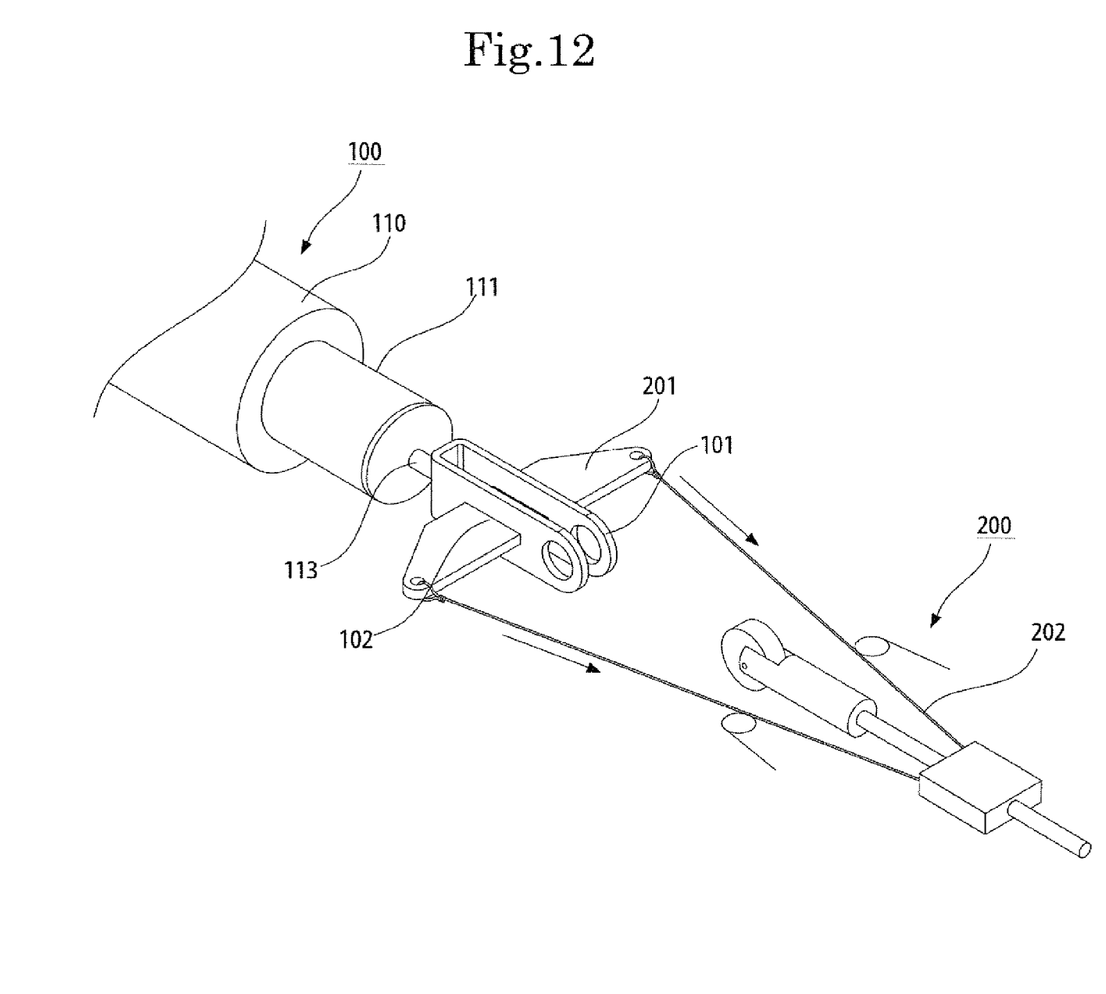
FIG. 12 is an overview diagram which shows the installation of a general tension balancer.

Here, the installation of a tension balancer to a train overhead wire is explained. FIG. 12 is an overview diagram which shows a simplification of the process of installing a general tension balancer. When either of the tension balancers 100 are installed on a train overhead wire, as is shown in FIG. 12, a hollow rod 113 is pulled a certain size in advance using a wire grip 200, a yoke 201 and a wire 202 and a spring is installed in a compressed state. A shackle shaped connecting part 101 (also called a pull) is arranged on an end of the hollow rod 113 of the tension balancer 100 in order to install the tension balancer 100 on the train overhead wire, and a yoke through hole 102 into which the yoke 201 is inserted is arranged on the shackle shaped connecting part 101. The yoke 201 is inserted into the yoke through hole 102, a wire 202 is inserted into a wire grip wire insertion hole 203 arranged on the yoke 201, the wire 202 is wound up by the wire grip 200 and the hollow rod 113 is pulled. Then the tension balancer 100 is installed by latching the train overhead wire to the shackle shaped connecting part 101.

Installation of the tension balancer 100 to the train overhead wire is performed during a short period of time at night between the times when few trains pass. In addition, the burden on the installers is large because installation of the tension balancer is performed at a significant height, in particular winding up the wire 202 with the wire grip 200. Thus, if the hollow rod 113 is extracted a certain size in advance and fixed before leaving the factory, it is possible to reduce the burden on the installers and improve installation efficiency.

Thus, in Japanese Laid Open Patent 2004-42780, a fixing device 1 of a tension balancer is proposed. However, because this fixing device 1 is fixed to the tension balancer 100 by a semicircular contact component 2 and a suppression band 5 which suppresses the opposite side of the contact component 2 as is shown in FIG. 3 of Japanese Laid Open Patent 2004-42780, it is necessary to remove bolts of both ends of a fixing yoke 4 and bolts which fix a pair of anti-pressure levers 3 to an ear 2 (total of 4 bolts) in order to remove the fixing device 1 after installation of the tension balancer 100 (refer to Japanese Laid Open Patent 2004-42780) and thus installation efficiency is not improved. In addition, because this fixing device is developed with the assumption that it will be retrieved and reused, it is very expensive and it is necessary for a user to store the fixing device until the next retrieval. In particular, because the total length of a fixing device of a Shinkansen (bullet train) overhead wire is 500 mm or more, storage space becomes a problem.

BRIEF SUMMARY OF THE INVENTION

The goal of the present invention is to provide a low cost tension balancer installation auxiliary device and overhead wire tension balancer which can improve installation efficiency.

According to one embodiment of the present invention, a tension balancer installation auxiliary device is provided including a fixing pipe which includes two open ends, a slit and a pair of first apertures, and a yoke, wherein one end of the fixing pipe is arranged to contact with a casing of the tension balancer, and the yoke is attached by passing through first through holes of a pair of shackle shaped connecting parts of the tension balancer and the pair of first apertures.

According to one embodiment of the present invention, a tension balancer installation auxiliary device is provided including a fixing pipe which includes two open ends, a slit having a width larger than a width of an overhead wire, and 2n (n is an natural number) pairs of second apertures, a yoke including n pairs of second through holes, and a fixing component, wherein one end of the fixing pipe is arranged to contact with a casing of the tension balancer, and the yoke is attached by passing through first through holes of a pair of shackle shaped connecting parts of the tension balancer, and the fixing component is attached by passing through each of the 2n pairs of second apertures and each of the n pairs of second through holes.

According to one embodiment of the present invention, a tension balancer is provided including a casing, a rod having a shackle shaped connecting part for latching to an overhead wire, the rod being arranged within the casing, and an installation auxiliary device including a fixing pipe and a yoke, wherein the shackle shaped connecting part includes a pair of first through holes, the fixing pipe includes two open ends wherein one end is arranged to contact with the casing, a slit having a width larger than a width of the overhead wire, and a pair of first apertures, and the yoke is attached by passing through each of the pair of first through holes of the rod and the pair of first apertures.

According to one embodiment of the present invention, a tension balancer is provided including a casing, a rod having a shackle shaped connecting part for latching to an overhead wire, the rod being arranged within the casing, and an installation auxiliary device including a fixing pipe, a fixing component and a yoke, wherein the shackle shaped connecting part includes a pair of first through holes, the fixing pipe includes two open ends wherein one end is arranged to contact with the casing, a slit, and 2n (n is a natural number) pairs of second apertures, the yoke includes n pairs of second through holes and is attached by passing through each of the pair of first through holes of the rod, the rod is extracted a first length from the casing so that each of the n pairs of second through holes of the attached yoke is coaxially positioned with each of the 2 n pairs of second apertures, the fixing component is attached by passing through each of the 2 n pairs of second apertures and the n pairs of second through holes.

A low cost tension balancer installation auxiliary device and overhead wire tension balancer is provided which can improve installation efficiency.

1: tension balancer installation auxiliary device
10: fixing pipe
20: yoke
30: slit
40: first aperture
41: second aperture
100: tension balancer
101: shackle shaped connecting part
102: first through hole
110: casing
113: rod

DETAILED DESCRIPTION OF THE INVENTION

The embodiments of the present invention are explained below while referring to the diagrams. Furthermore, the same structural elements in the embodiments are labeled with the same reference symbols and thus overlapping explanations between embodiments are omitted.

First Embodiment

Structure of the Installation Auxiliary Device

Figure 1:
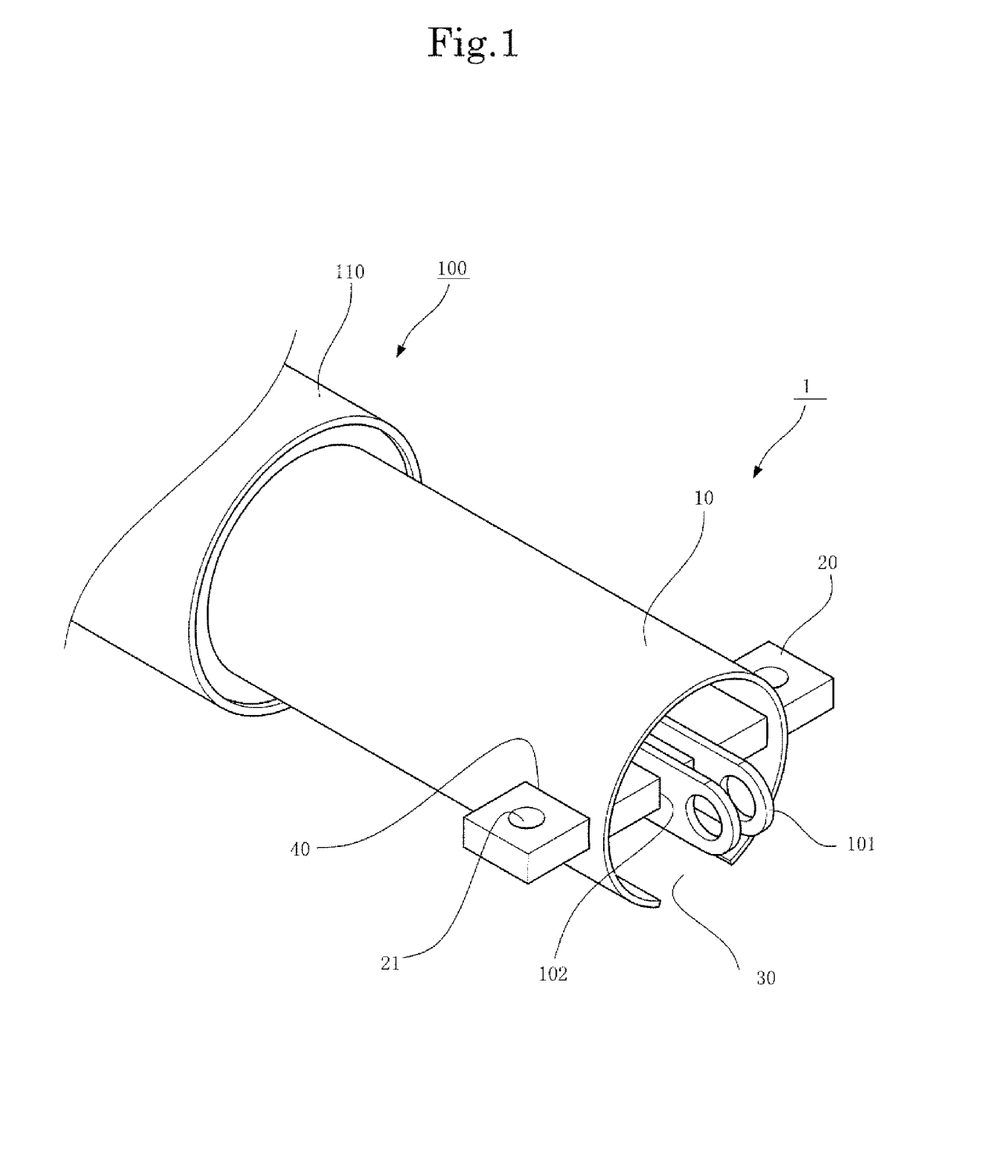
FIG. 1 is an approximate diagram of a tension balancer installation auxiliary device related to one embodiment of the present invention.
Figure 2:
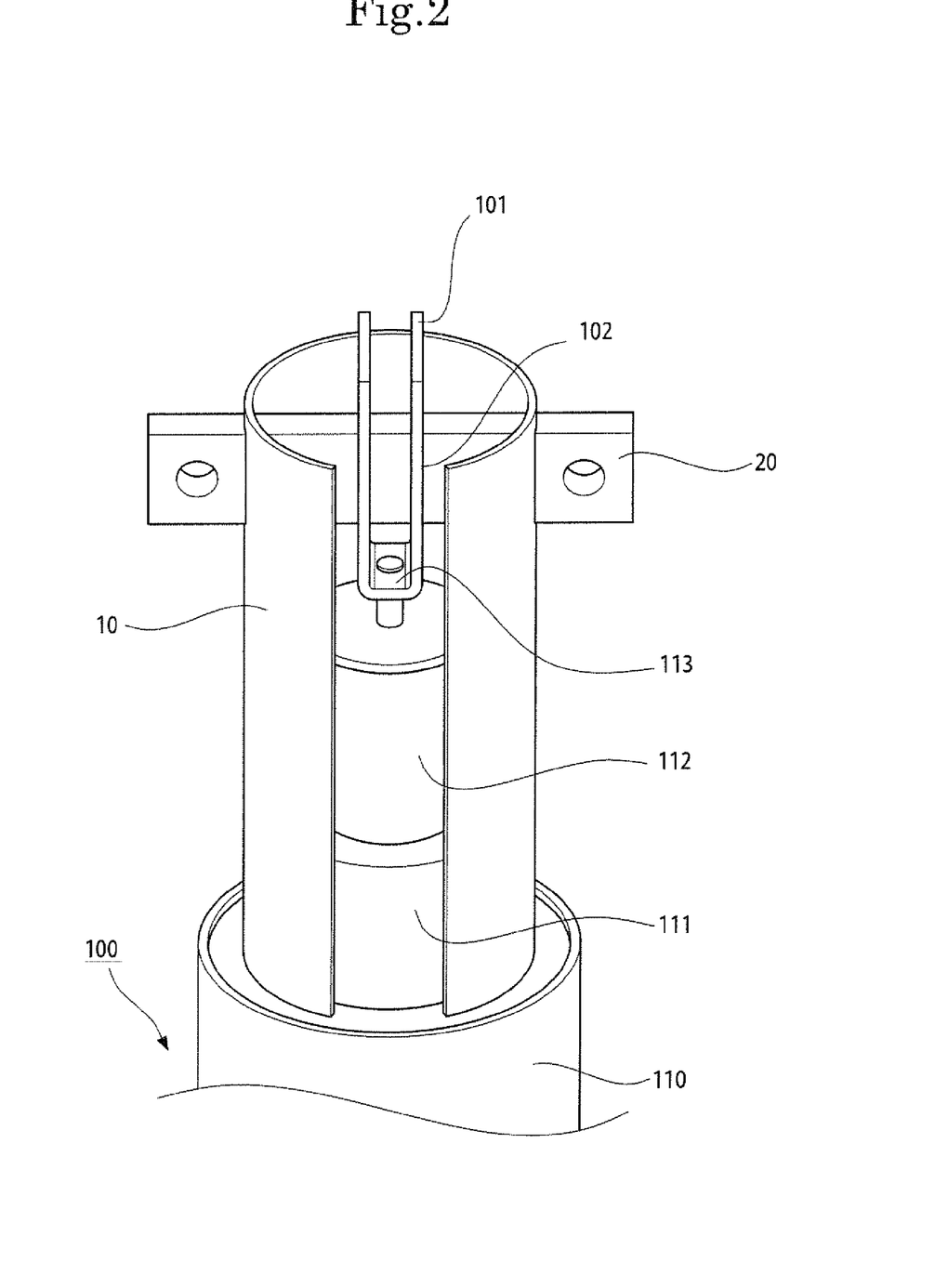
FIG. 2 is an approximate diagram of a tension balancer installation auxiliary device seen from a bottom side related to one embodiment of the present invention.
Figure 3:
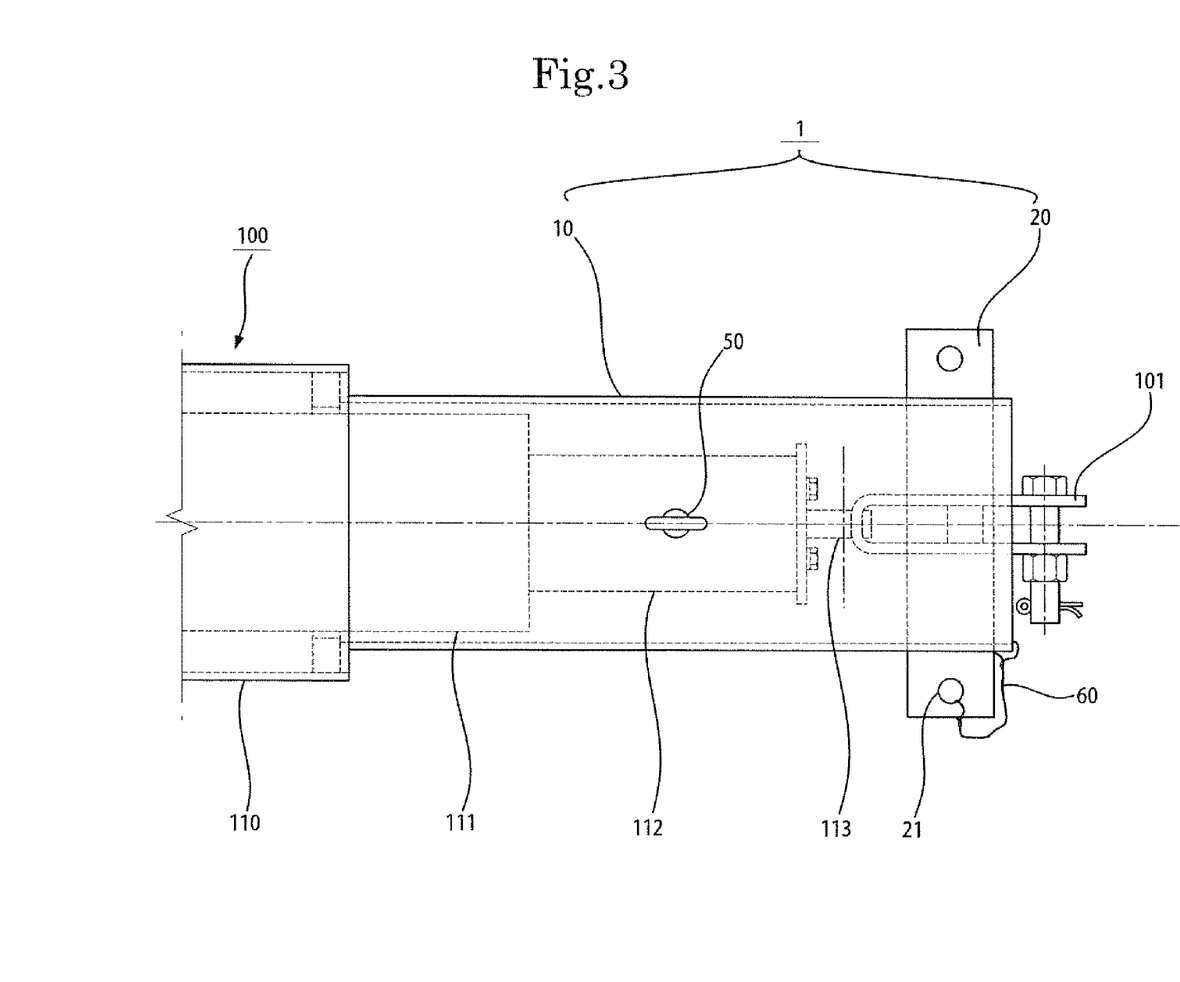
FIG. 3 is a planar cross sectional diagram of a tension balancer installation auxiliary device related to one embodiment of the present invention.
Figure 4:
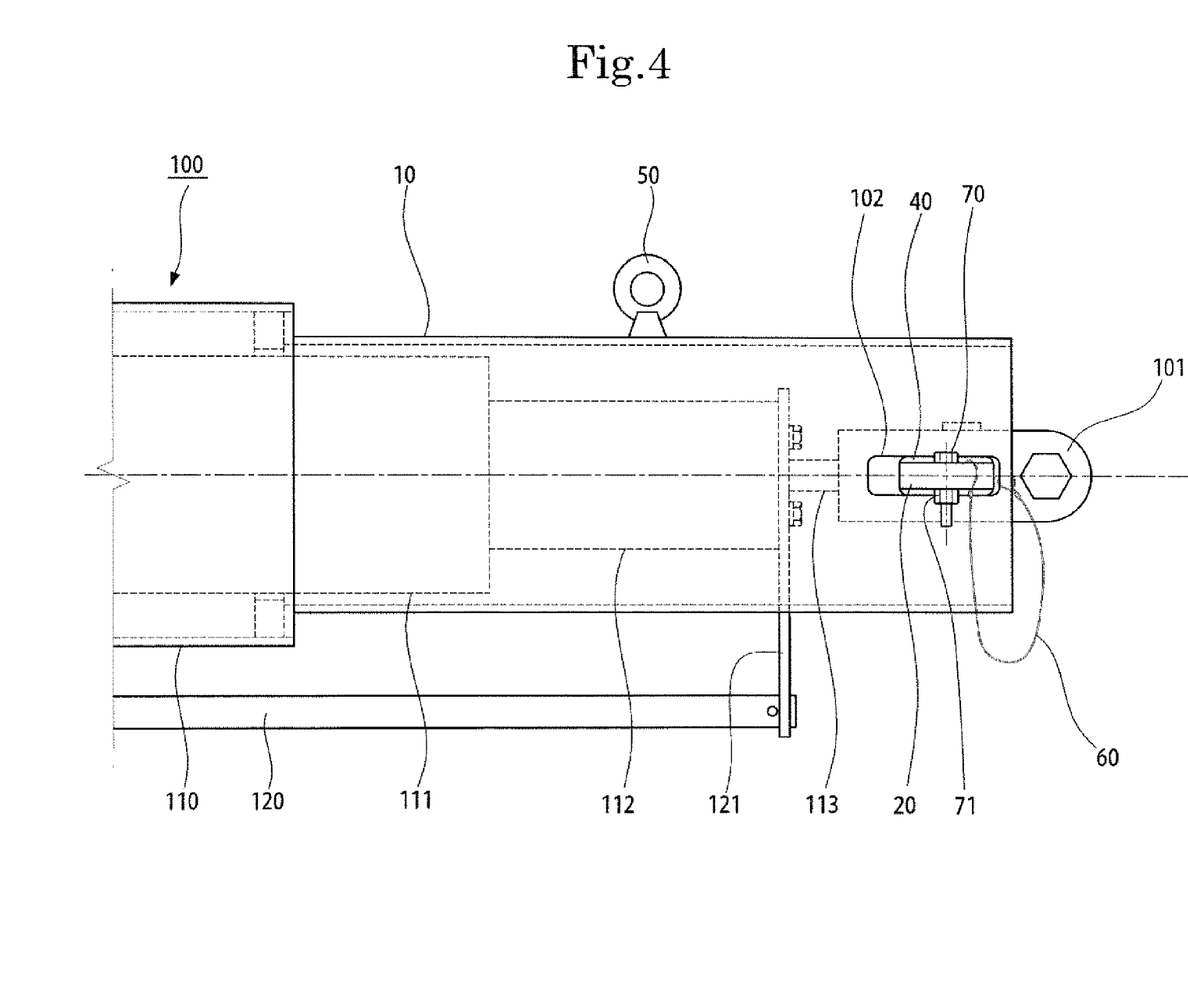
FIG. 4 is a perpendicular cross sectional diagram of a tension balancer installation auxiliary device related to one embodiment of the present invention.
Figure 5:
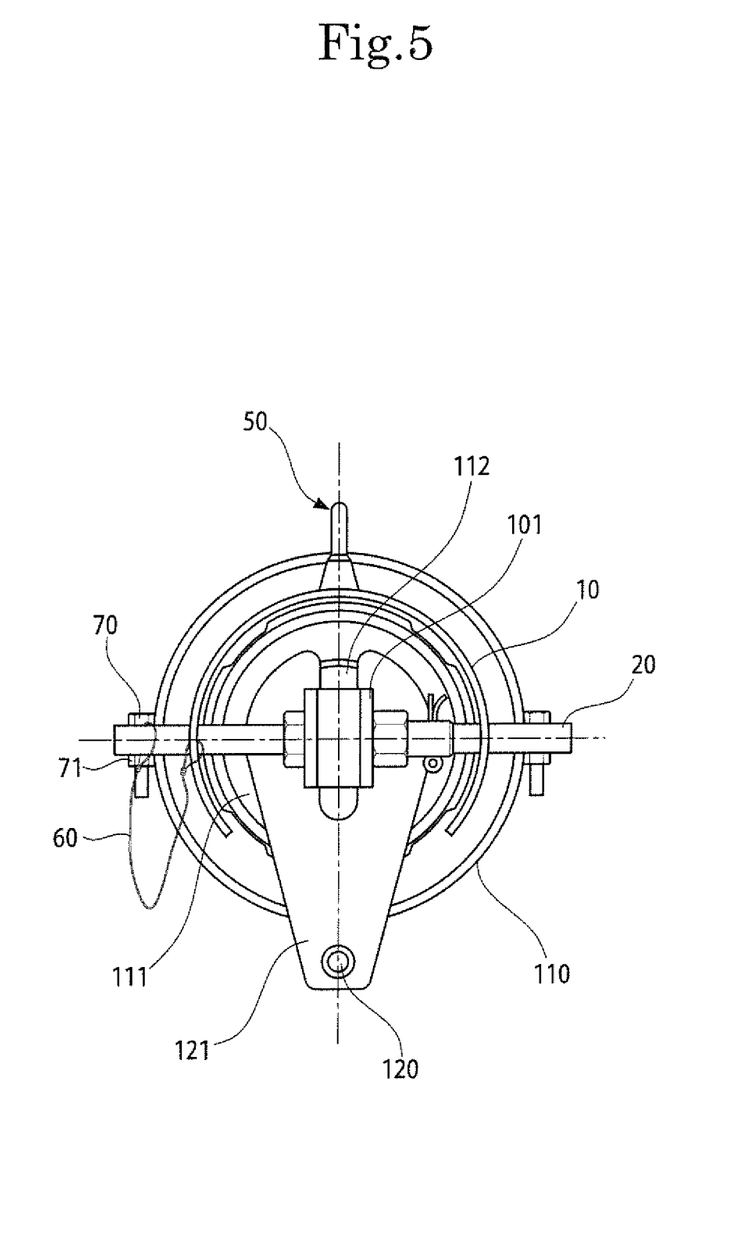
FIG. 5 is an exemplary planar diagram seen from an end of a tension balancer installation auxiliary device related to one embodiment of the present invention.
Figure 6:
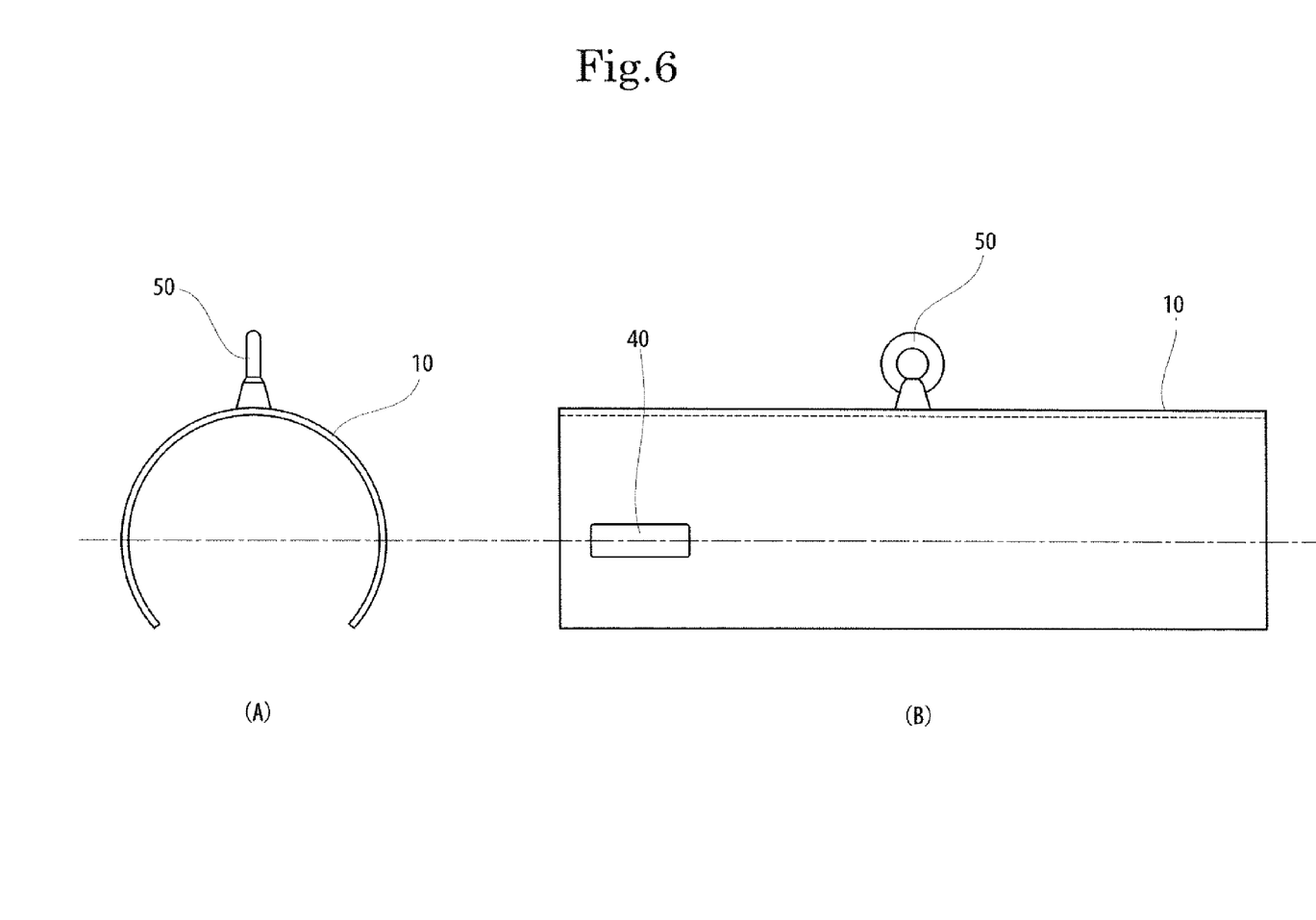
FIG. 6 is an exemplary diagram of a fixing pipe 10 of a tension balancer installation auxiliary device related to one embodiment of the present invention.

FIG. 1 is an approximate diagram of a tension balancer installation auxiliary device related to one embodiment of the present invention. FIG. 2 is an approximate diagram of a tension balancer installation auxiliary device seen from a bottom side related to one embodiment of the present invention. FIG. 3 is a planar cross sectional diagram of a tension balancer installation auxiliary device related to one embodiment of the present invention, and FIG. 4 is a perpendicular cross sectional diagram of a tension balancer installation auxiliary device related to one embodiment of the present invention. Furthermore, FIG. 5 is an exemplary planar diagram seen from an end of a tension balancer installation auxiliary device related to one embodiment of the present invention, and FIG. 6 is an exemplary diagram of a fixing pipe 10 of a tension balancer installation auxiliary device related to one embodiment of the present invention. As is shown in FIG. 1, the tension balancer installation auxiliary device 1 related to one embodiment of the present invention is roughly comprised from a fixing pipe 10 and a yoke 20. This installation auxiliary device 1 is arranged so that the fixing pipe 10 contacts with the casing 110 as is shown in FIG. 2. In addition, the yoke 20 is attached in a state where middle pipes 111 and 112 and a rod 113 of the tension balancer 100 are extracted from the casing 110, and passes through a pair of first apertures 40 arranged on the fixing pipe 10 and a pair of first through holes 102 of the shackle shaped connecting part 101 arranged on an end of the rod 113. The state in which the yoke 20 passes through the first aperture 40 and the first through hole 102 can be understood from FIG. 3. In addition, the state in which the yoke 20 passes through the first aperture 40 can be understood from FIG. 5.

The fixing pipe 10 is a cylindrical component with two open ends and is formed with a slit 30 having a certain width. In the present embodiment, a cylindrical fixing pipe 10 is also used because the tension balancer 100 attached with the fixing pipe 10 is arranged with a plurality of cylindrical pipes having a telescopic form. The diameter of the fixing pipe 10 is formed smaller than the diameter of the casing 110 of the tension balancer 100. This is because one open end of the fixing pipe 10 contacts with the casing 110 in the case where the fixing pipe 10 is attached to the tension balancer 100 and so that the fixing pipe 10 does not fall out from the casing 110 side. In addition, a pipe having the same shape as the shape of the tension balancer 100 can be preferably used as the fixing pipe 10. However, the shape of the fixing pipe 10 is not limited to this. Provided that the one end of the fixing pipe 10 is in contact with the casing 110 and does not fall out from the tension balancer 100 side, the shape of the fixing pipe 10 may be different to the shape of the tension balancer 100. However, whatever the shape of the fixing pipe 10, a slit 30 having the predetermined width stated above is formed and used.

When the tension balancer 100 is fixed to an overhead wire and installation is complete, this slit 20 is used for removing the fixing pipe 10 from the overhead wire. Therefore, the width W of the slit is set larger than the width W of the overhead wire to which the tension balancer 100 is attached, and is set appropriately according to the width of the overhead wire. Furthermore, as is shown in FIG. 4 and FIG. 5, in order to display the tension of the tension balancer 100, in the case where a scale plate 121 or an indicator plate is attached to the tension balancer 100 via a support arm 120, the width W of the slit is set while considering the sizes.

In addition, a pair of the first apertures 40 having a predetermined shape are arranged opposite each other and coaxially in the diameter direction of the fixing pipe 10 on one open end side of the fixing pipe 10. In order to reduce the installation work load of the tension balancer 100 which is manufactured, the first aperture 40 is inserted into the yoke 20 which latches a hollow rod (below referred to simply as rod) 113 of the tension balancer 100 which is extracted a certain length. Therefore, the shape of the first aperture 40 can be appropriately changed by setting according to the shape of the yoke 20. In addition, as is shown in FIG. 4, the size of the first aperture 40 is set slightly large so that it becomes easier to attach the yoke 20, and a large allowance is arranged particularly in a horizontal direction. The weight of the overhead wire is applied to the rod 113 when attaching the tension balancer 100. Therefore, the ability of the yoke 20 to slide horizontally is secured and installation work load is easily performed. In addition, it is possible to make the yoke 20 horizontally slidable when installing the tension balancer auxiliary device 1 on the tension balancer 100.

In addition, the first aperture 40 is arranged on the fixing pipe 10 according to the position of the first through hole 102 when the rod 113 is pulled from the casing 110 a first distance. That is, from one end of the fixing pipe 10 which contacts with the casing 110, the end part of the casing side first aperture 40 is arranged in a position in which the pulled out length of the rod 113 (this is equivalent to the first length) which is measured when leaving the factory is added to the length from the casing 110 in which the end of the first through hole 102 on the casing 110 side is positioned in a state in which the rod 113 is not pulled out. Therefore, if the rod 113 is pulled out a certain length before leaving the factory, the first aperture 40 and the first through hole 102 are almost positioned in one row and it is possible to easily pass the yoke 20 through the first aperture 40 and the first through hole 102. Furthermore, the position in which the first aperture 40 is arranged is appropriately changed according to the required length which the rod 113 is pulled out.

Furthermore, as is shown in FIG. 6, an eye nut 50 may be arranged at a position opposite the slit 30 of the fixing pipe 10. The eye nut 50 is a component for locking a wire etc which fixes the fixing pipe 10 to the overhead wire so that the fixing pipe 10 doesn't fall when installing. In addition, as is shown in FIG. 3, in order to prevent the yoke 20 from falling, a through hole is arranged on the fixing pipe 10, a yoke tethered component 60 such as a wire is arranged and one end of the wire may be attached to the through hole 21 which is arranged on the yoke 20. A grip wire insertion hole is arranged in advance on the yoke 20 and in this case it is possible to divert the grip wire insertion hole.

The yoke 20 is passed through a pair of first apertures 102 of the shackle shaped connecting part 101 arranged on the rod 113 of the tension balancer 100 and a pair of first apertures 40 arranged on the fixing pipe 10, and locks the rod 113 which is pulled out from the tension balancer 100 at a certain position. As stated above, the installation of the conventional tension balancer 100 uses a grip wire 2000, a yoke 201 and a wire 202, the yoke 201 is passed through the first through hole 102 of the shackle shaped connecting part 101, the wire 202 is attached to both ends of the yoke and pulled by the grip wire 200. Therefore, the conventional yoke 201 may be used as the yoke 20 of the tension balancer installation auxiliary device related to the present invention. In addition, because the yoke 201 is used during the installation as stated above, a pair of first through holes 102 is arranged on the shackle shaped connecting part 101. Therefore, the tension balancer installation auxiliary device 1 related to an embodiment of the present invention can be used on the tension balancer 100 without an additional process. Furthermore, in order to prevent the yoke 20 from falling out, movement of the yoke 20 may be restricted in a width direction by inserting a bolt 70 into the through hole 21 and fixing with a nut 71.

In the present embodiment, the fixing pipe 10 and the yoke 20 are formed using a structured steel pipe of SS400 or STK400 and a plating process is performed on the surface to prevent rust. The material of the fixing pipe 10 is not limited to this. The material may be appropriately changed according to the rebound force of a spring of the tension balancer related to the rod 113 which is pulled out. In addition, if a galvanized steel pipe is used instead of the structured steel pipe, it is possible to omit the plating process.

In addition, in the present embodiment, the fixing pipe 10 was formed in a circular shape, however, the shape of the fixing pipe 10 is not limited to this. If the size of the fixing pipe 10 is such that, as stated above, one end of the fixing pipe 10 is contacted with the casing 110 so that it doesn't fall out from the tension balancer 100 side, then the fixing pipe 10 may have for example, an elliptic shape or a polygonal column such as triangular column or square column shape.

Installation and Removal of the Installation Auxiliary Device

The installation and removal of the tension balancer installation auxiliary device 1 related to one embodiment of the present invention having the structure stated above will be explained. As stated above, the tension balancer installation auxiliary device 1 is attached when the tension balancer 100 leaves the factory.

In order to reduce the burden of installation of the tension balancer 100, the rod 113 is pulled out from the casing 110 a certain length in advance according to the tension required by the overhead wire and in this state is fixed by the tension balancer installation auxiliary device 1.

First, the fixing pipe 10 is attached from the end side of the completed tension balancer 100. Next, a wire is arranged on the overhead wire latch hole 103 of the end of the shackle shaped connecting part 101, the wire is mechanically pulled and the rod 113 is pulled out a certain length from the casing 110. At this time, an elastic means such as a spring arranged on the tension balancer 100 is in a compressed state. When the rod 113 is pulled out a certain length from the casing 110, the pair of first apertures 40 arranged on the fixing pipe 10 are formed in a position which is almost horizontal with the pair of first through holes 102 of the shackle shaped connecting part 101. Therefore, when the rod 113 is pulled out a certain length from the casing 110, the first apertures 40 and the first through holes 102 are almost aligned in a row. In this state, the yoke 20 is inserted to pass through the four apertures and through holes. When the pulling is stopped, the rod 113 returns in the direction of the casing 110 by the rebound force of the elastic means arranged within the tension balancer 100. The yoke 20 contacts with an end of the first aperture 40 and the first through hole 102 on casing 110 side, and the return of the rod 113 is stopped. If the wire is removed from the overhead wire latch hole 103, it is possible to deliver the tension balancer 100 in a state in which the rod 113 is pulled out a certain length.

On the other hand, in the case where the tension balancer 100 is arranged on the overhead wire, first, the tension balancer 100 is attached to a support column via a fixing component such as the shackle shaped connecting part arranged on the rear end part of the tension balancer 100. Next, the wire 202 is connected to the yoke 20 and the rod 113 is pulled further using the grip wire 200 and attached to the overhead wire. The weight of the overhead wire is applied to the rod 113 of the tension balancer 100 and the rod 113 is pulled to the overhead wire side. At the same time, the first through hole 102 also moves to the overhead wire side and the contact between the yoke 20 and the end part of the first aperture 40 on the casing side is removed. The wire is removed and the yoke 20 is removed. The fixing pipe 10 becomes movable. Therefore, the fixing pipe 10 is moved to the overhead wire side and the fixing pipe 10 is removed from the overhead wire side using the slit 30. Using these operations it is possible to simply remove the tension balancer installation auxiliary device 1. In particular, the tension balancer 100 requires installing by pulling the rod 113 out a required length using the grip wire 200. Therefore, on site installation work is reduced if the rod 113 is pulled out close to the required length in advance.

Effects

As explained above, the tension balancer installation auxiliary device 1 related to an embodiment of the present invention can be provided which has a simple structure and can reduce the burden of on site installation. In addition, it is possible to provide the tension balancer 100 arranged with this device. Therefore, it is possible to significantly reduce the burden of on site installation and improve installation efficiency. In particular, there is a large effect on a train overhead wire tension balancer which is installed during the night when passing trains are few.

In addition, because the tension balancer installation auxiliary device 1 related to an embodiment of the present invention has a simple structure it is possible to significantly reduce costs compared to a conventional auxiliary device. In particular, because it is possible to use the yoke 201 which is used in a general grip wire 200, the yoke 20 is effective in reducing costs. In addition, because it is also possible to form the fixing pipe 10 using a general steel pipe, costs can be reduced. This also leads to a reduction in an increase in costs of the tension balancer arranged with the tension balancer installation auxiliary device. Therefore, the tension balancer 100 related to one embodiment of the present invention is low in cost and can improve installation efficiency.

Second Embodiment

Figure 7:
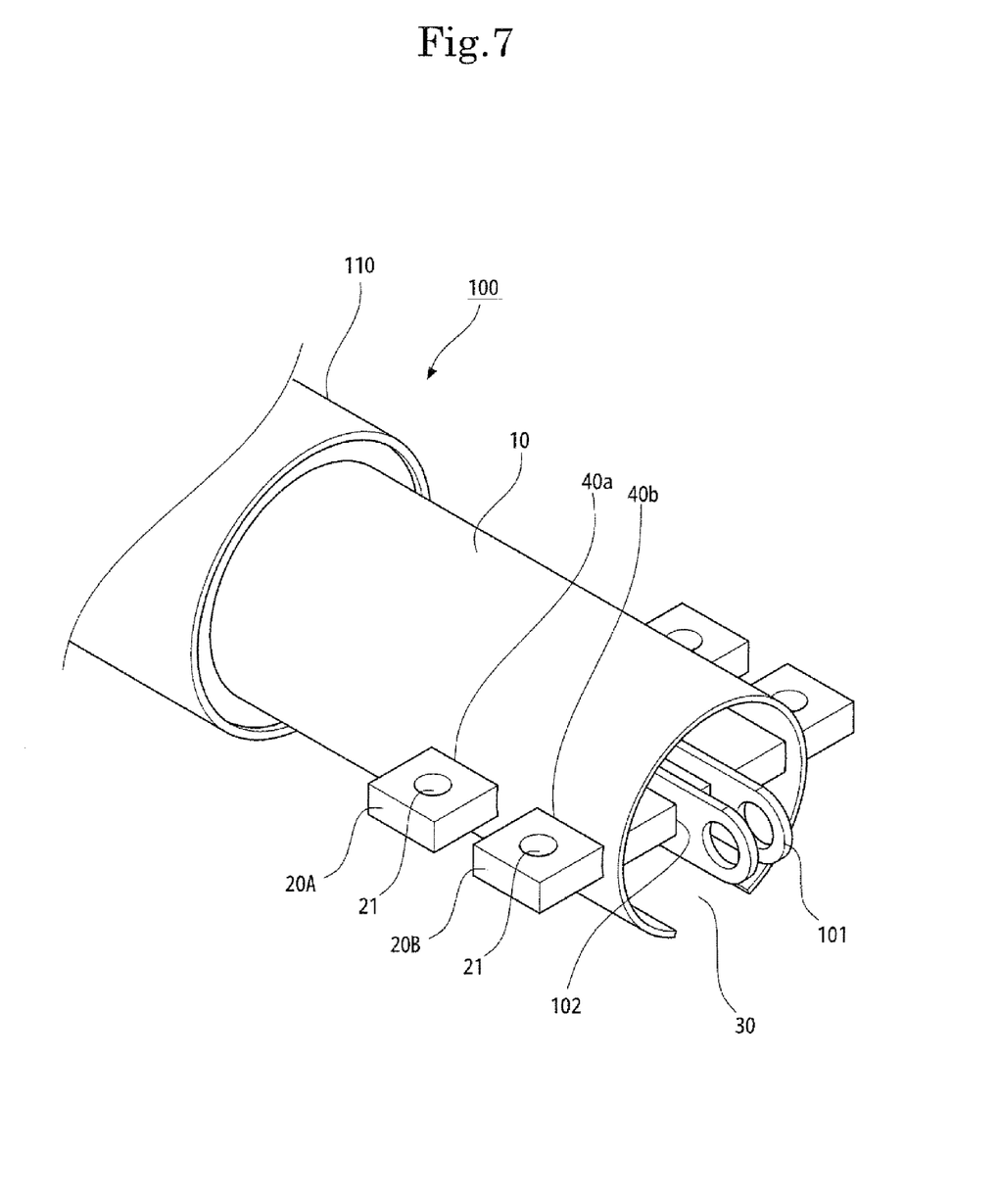
FIG. 7 is an exemplary diagram of the tension balancer installation auxiliary device 1 related to a second embodiment of the present invention.

In the tension balancer installation auxiliary device 1 related to the first embodiment described above the rod 113 which is pulled out a certain length from the casing 110 is fixed by one yoke 20. The force with which the rod 113 is pulled back into the casing 110 is applied to the fixed rod 113. At this time, the movement of the yoke 20 is restricted by the end part of the pair of first apertures 40 on the casing 10 side. Therefore, force is concentrated on the end part of the pair of first apertures 40 on the casing 110 side. Therefore, in order to diffuse this force a number of pairs of first apertures 40 increase and the yoke 20 is arranged according to the number of pairs of first apertures 40. FIG. 7 is an exemplary diagram of the tension balancer installation auxiliary device 1 related to a second embodiment of the present invention. The tension balancer installation auxiliary device 1 related to a second embodiment of the present invention is arranged with two yokes 20 and two pairs of first apertures 40 as shown in FIG. 7. The tension balancer installation auxiliary device 1 related to a second embodiment of the present invention is explained below based on the diagrams. Furthermore, overlapping explanations are omitted.

As is shown in FIG. 7, the tension balancer installation auxiliary device 1 related to a second embodiment includes two pairs of first apertures 40a, 40b on the fixing pipe 10. In addition, two pairs of first through holes 102 are also arranged on the shackle shaped connecting part 102 of the tension balancer 100. Therefore, it is necessary to arrange the shackle shaped connecting part 102 according to the tension balancer 100 in the case where this tension balancer installation auxiliary device 1 is used. Furthermore, a yoke 20A and 20B are also arranged.

The two pairs of first apertures 40a and 40b are formed with an interval between them so that their central axis are the same in a horizontal direction and the central axis are parallel in the diameter direction of the fixing pipe 10. While the shape and size of the two pairs of apertures are basically the same, it is not limited to this. One aperture may have a different shape from the other and one aperture may have a different size from the other. However, in this case, the size and shape of the two pairs of first through holes 102 of the shackle shaped connecting part 102 are adjusted to correspond.

On the other hand, the two yokes 20A and 20B are appropriately selected according to each of the first apertures 40a and 40b. Each of the yokes 20A and 20B may include a through hole 21. In addition, each of the yokes 20A and 20B may be arranged with a yoke tethered component 60. Furthermore, because the method for installing and removing the tension balancer installation auxiliary device 1 related to the second embodiment of the present invention is the same as the method described in the first embodiment above, an explanation is omitted here. In addition, if this tension balancer installation auxiliary device 1 is installed, the tension balancer 100 having the tension balancer installation auxiliary device 1 is provided.

In the tension balancer installation auxiliary device 1 which has the structure described above and the tension balancer 100 which includes the tension balancer installation auxiliary device 1 related to the second embodiment of the present invention, because the movement of each yoke 20A and 20B is stopped by the end part of the two pairs of first apertures 40a and 40b on the casing 110 side, it is possible to securely fix the rod 113. In addition, the tension balancer installation auxiliary device 1 related to the second embodiment is stronger to damage of the fixing pipe 10 than the tension balancer installation auxiliary device 1 related to the first embodiment. Therefore, in order to reduce weight, the fixing pipe 10 is formed thinner or a notch section or through hole can be arranged on the fixing pipe 10.

In addition, because there are two yokes 20A and 20B, even if one yoke falls out during transfer, it is possible to securely fix the rod 113 in the pulled out state.

Third Embodiment

Figure 8:
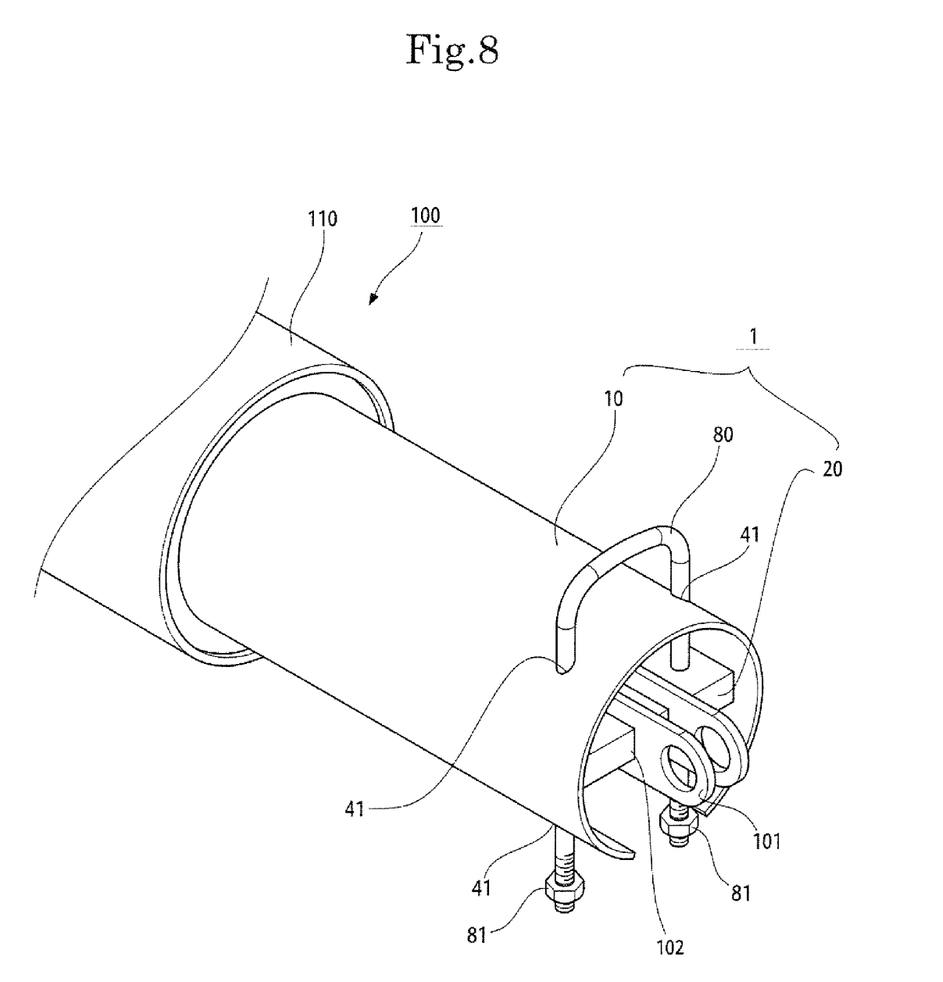
FIG. 8 is an exemplary diagram of the tension balancer installation auxiliary device 1 related to a third embodiment of the present invention.

Furthermore, another embodiment is explained in order to diffuse the force applied to the end part of the pair of first apertures 40 on the casing 110 side. FIG. 8 is an exemplary diagram of the tension balancer installation auxiliary device 1 related to a third embodiment of the present invention. As is shown in FIG. 8, the tension balancer installation auxiliary device 1 related to the present embodiment is different to that of the first embodiment in that it does not include a first aperture 40 on the fixing pipe 10. Instead, 2n (n is a natural number) pairs of apertures 41 are arranged on the fixing pipe 10. Also, the yoke 20 is latched by a bolt 80 and nut 81. In FIG.

8, the yoke 20 is latched with a U shaped bolt 80 and nut 81. However, it is not limited to this. However, although not shown in the diagrams, the rear end part of a general tension balancer is open, a bottom plate is arranged within the casing 110, and the movement of the bottom plate is restricted by a U shaped bolt and nut. If this U shaped bolt and nut are used, costs can be reduced and therefore the U shaped bolt 80 and nut 81 are favorably used.

The second apertures 41 are arranged opposite each other and are coaxial in a diameter direction. In addition, n (n is a natural number) pairs of through holes 22 are arranged to match the intervals between the 2n (n is a natural number) pairs of second apertures 41 on the yoke 20.

After the yoke 29 is attached to the shackle shaped connecting part 102, the fixing pipe 10 is attached to the tension balancer 100. A wire is attached to the yoke 20 and the rod 113 is mechanically pulled and in a state in which the second aperture 41 and the through hole 22 are aligned in a row, the U shaped bolt is attached passing through the second aperture 41 and the through hole 22 and tightened with the nut 81. When the pulling is stopped and the wire removed, the rod 113 is pulled from the casing 110 and the movement of the rod 113 is restricted by the 2n pairs of second apertures. The movement of the U shaped bolt 80 is restricted by the four second apertures 41. Because the force related to the four second apertures 41 is diffused, it is possible to prevent damage to the fixing pipe 10. In addition, because a large aperture is not arranged on the fixing pipe 10, it is also possible to secure strength of the fixing pipe 10.

Furthermore, by increasing the number of U bolts 80 it is possible to latch ever more rigidly. In addition, the U bolt 80 and nut 81 related to the present embodiment may be further added to the tension balancer installation auxiliary device 1 related to the first embodiment to strengthen fixing.

TRANSFORMATION EXAMPLE

Figure 9:
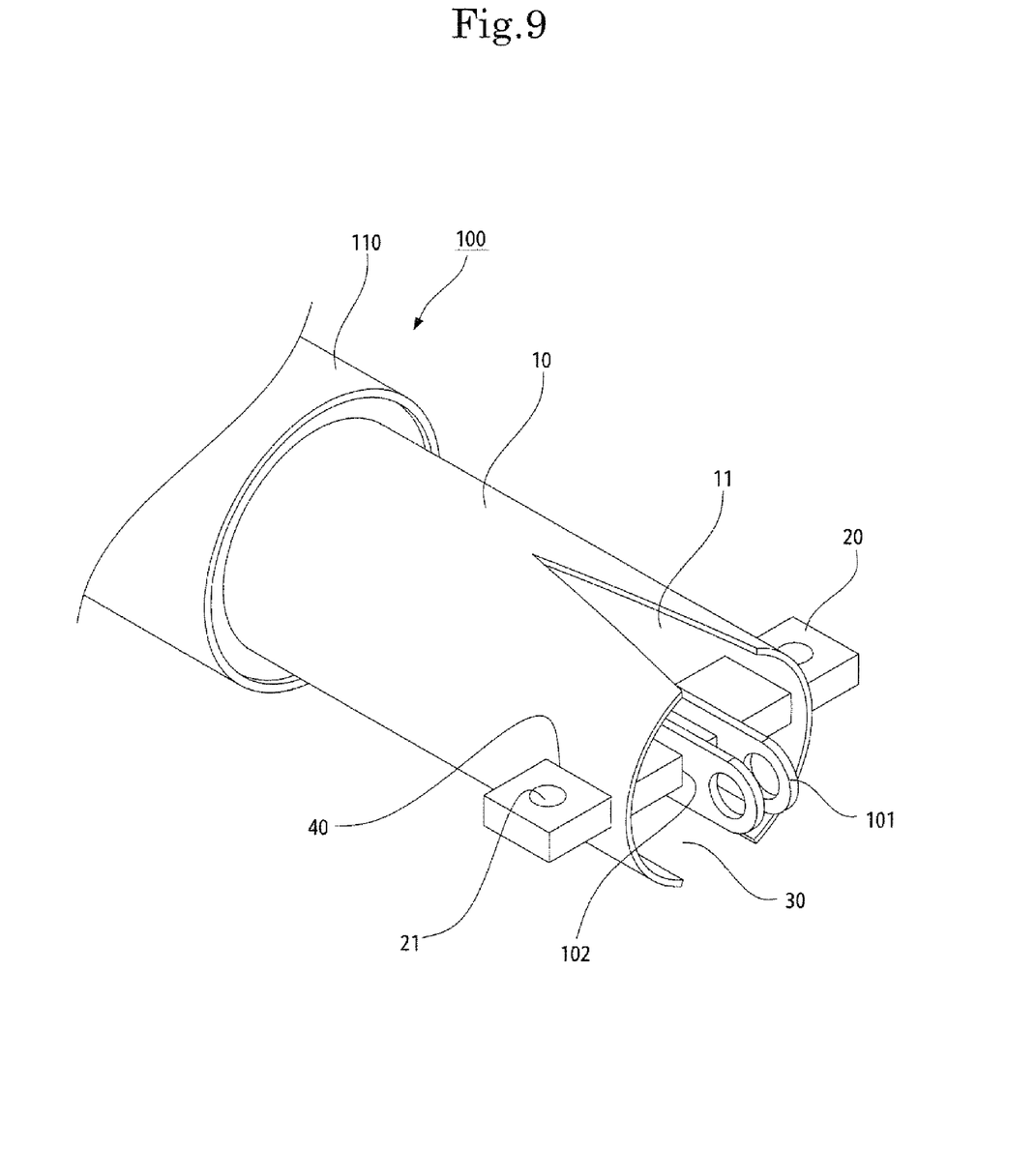
FIG. 9 is a diagram which shows a transformation example of the fixing pipe 10 of the tension balancer installation auxiliary device 1 related to the present invention.
Figure 10:
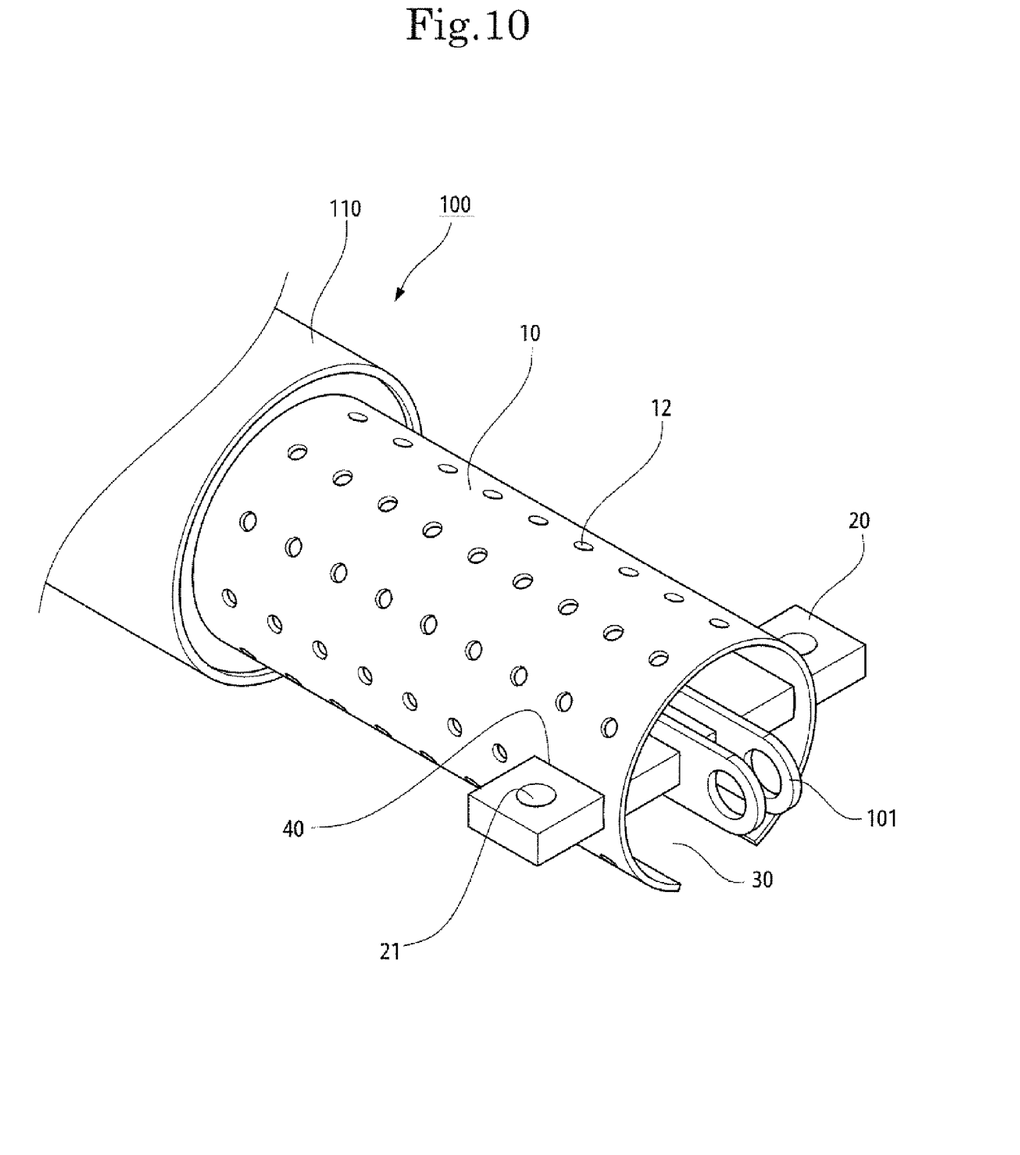
FIG. 10 is a diagram which shows a transformation example of the fixing pipe 10 of the tension balancer installation auxiliary device 1 related to the present invention.
Figure 11:
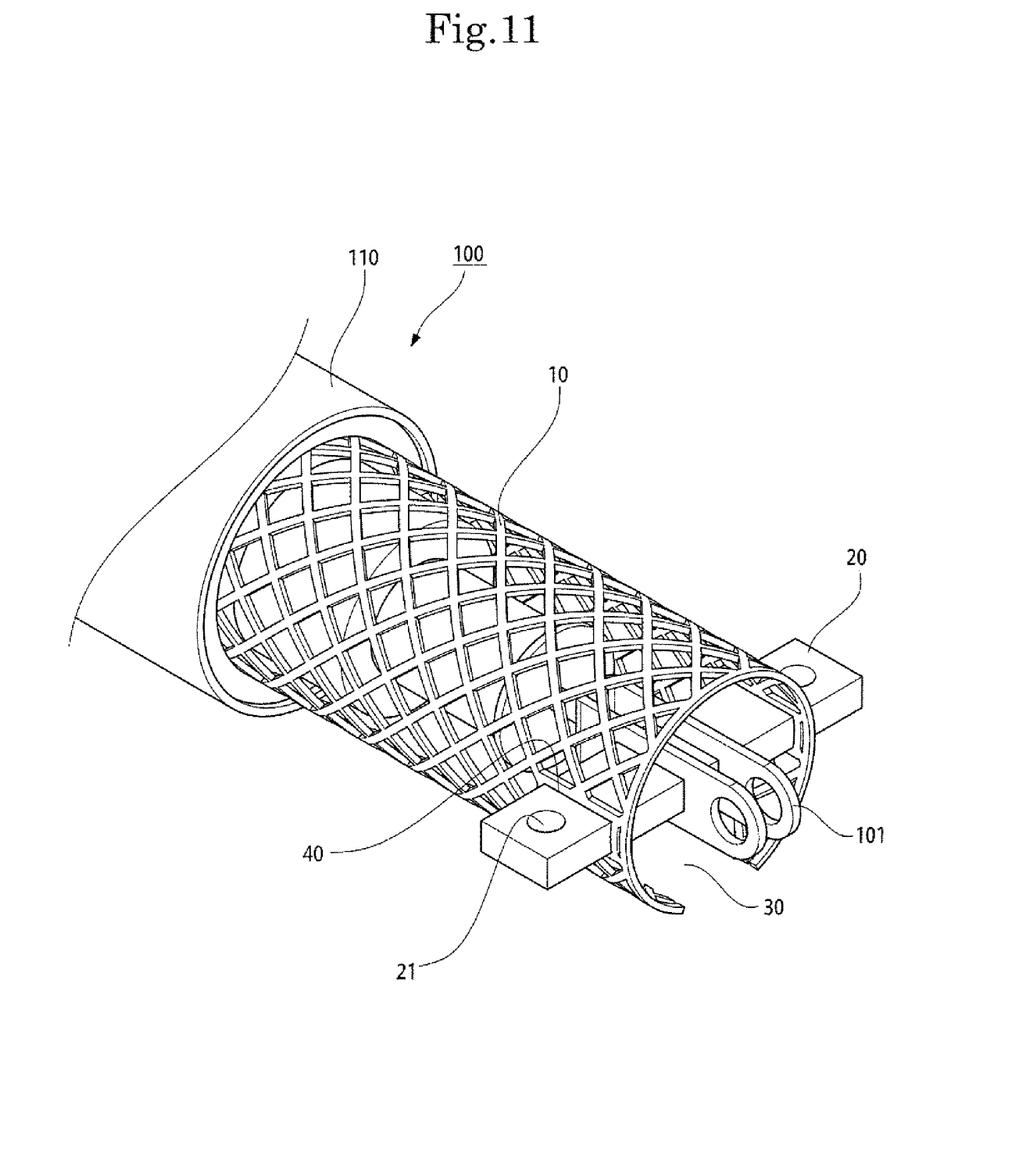
FIG. 11 is a diagram which shows a transformation example of the fixing pipe 10 of the tension balancer installation auxiliary device 1 related to the present invention.

A transformation example of the tension balancer installation auxiliary device 1 related to the first, second and third embodiments of the present invention stated above is explained based on the diagrams. FIG. 9 to FIG. 11 are diagrams which shows a transformation example of the fixing pipe 10 of the tension balancer installation auxiliary device 1 related to the present invention.

As stated above, the tension balancer installation auxiliary device 1 related to the present invention is used in a tension balancer 100 arranged on a train overhead wire. Because the train overhead wire tension balancer has a large tension, the weight of the tension balancer is extremely heavy. In particular, the total length of the train overhead wire tension balancer of a Shinkansen (bullet train) is 750 mm or more and exceeds 20 kg. Therefore, when the tension balancer installation auxiliary device 1 is heavy, installation effects become worse. Also, the total weight of the tension balancer installation auxiliary device 1 affects the weight of the fixing pipe 10. Thus, reducing the weight of the fixing pipe 10 is considered. However, because a very large force is applied to the fixing pipe 10 it is necessary to also secure strength.

Thus, as is shown in FIG. 9, a notch section 11 is arranged on the fixing pipe 10. If the notch section 11 is arranged on an upper part where there is little effect on the first aperture 40 which supports the yoke 20 it is possible to reduce weight. However, the arrangement position of the notch section 11 is not limited to the upper part. In addition, the number of notch sections 11 which can be arranged is not limited to one. If a required number of notch sections 11 are arranged in a position which can secure strength, it is possible to further reduce the weight of the fixing pipe 10.

FIG. 10 is another transformation example of the fixing pipe 10. In the present transformation example, in order to reduce weight while securing strength of the fixing pipe 10, a plurality through holes 12 are arranged on the fixing pipe 10 similar to an exhaust used on a motorcycle. In the present example, a plurality of through holes 12 are arranged in a plurality of rows, however, this can be appropriately changed. In addition, FIG. 11 is a further transformation example of the fixing pipe 10. In the present example, an example is shown of arranging a plurality of same shaped through holes 12 in a mesh shape. It is also possible to reduce the weight of the fixing pipe 10 by such an arrangement method.

What is claimed is:

1. A tension balancer installation auxiliary device comprising:
    a fixing pipe which includes two open ends, a slit and a pair of first apertures; and
    a yoke;
    wherein
        one end of the fixing pipe is arranged to contact with an outside of a casing of the tension balancer, and the yoke is attached by passing through a pair of first through holes of a pair of shackle shaped connecting part of the tension balancer on the side of an overhead wire and the pair of first apertures.

2. The tension balancer installation auxiliary device according to claim 1, wherein the fixing pipe has a plurality of pairs of aperture groups which include the pair of first apertures arranged at a position where the distance from the casing is closest, a plurality of yokes is arranged corresponding to the aperture group, and each yoke is attached by passing through each of the plurality of pairs of first through holes of the shackle shaped connecting part of the tension balancer, and each of the plurality of pairs of aperture groups.

3. The tension balancer installation auxiliary device according to claim 1, wherein the fixing pipe has a cross sectional shape which is either circular, elliptical or polygonal.

4. The tension balancer installation auxiliary device according to claim 1, wherein the fixing pipe includes one or more notch sections.

5. The tension balancer installation auxiliary device according to claim 1, wherein the fixing pipe includes one or more through holes.

6. The tension balancer installation auxiliary device according to claim 1, wherein the fixing pipe further includes an eye nut.

7. The tension balancer installation auxiliary device according to claim 1, wherein the fixing pipe further includes one or more tethered components for tethering the fixing pipe to the yoke.

8. A tension balancer comprising:
    a casing;
    a rod having a shackle shaped connecting part on the side of an overhead wire for latching to the overhead wire, the rod being arranged within the casing; and
    an installation auxiliary device including a fixing pipe and a yoke;
    wherein
        the shackle shaped connecting part on the side of the overhead wire includes a pair of first through holes,
        the fixing pipe includes two open ends wherein one end is arranged to contact with the outside of the casing, a slit having a width larger than a width of the overhead wire, and a pair of first apertures, and the yoke is attached by passing through each of the pair of first through holes of the shackle shaped connecting part of the rod on the side of the overhead wire and the pair of first apertures.

9. The tension balancer according to claim 8, wherein the fixing pipe has a cross sectional shape which is either circular, elliptical or polygonal.

10. The tension balancer according to claim 9, wherein the fixing pipe includes one or more notch sections.

11. The tension balancer according to claim 9, wherein the fixing pipe includes one or more through holes.

12. The tension balancer according to claim 9, wherein the fixing pipe further includes an eye nut.

13. The tension balancer according to claim 9, wherein the fixing pipe further includes one or more tethered components for tethering the fixing pipe to the yoke.

* * * * *